(12) United States Patent
Ishii et al.

(10) Patent No.: US 8,709,124 B2
(45) Date of Patent: Apr. 29, 2014

(54) SINTERED SLIDING MEMBER

(75) Inventors: Yoshinari Ishii, Niigata (JP); Tsuneo Maruyama, Niigata (JP); Yoshiki Tamura, Niigata (JP)

(73) Assignee: Diamet Corporation, Nigata-shi (JP)

( * ) Notice: Subject to any disclaimer, the term of this patent is extended or adjusted under 35 U.S.C. 154(b) by 179 days.

(21) Appl. No.: 13/504,645

(22) PCT Filed: Dec. 7, 2010

(86) PCT No.: PCT/JP2010/071879
§ 371 (c)(1),
(2), (4) Date: Apr. 27, 2012

(87) PCT Pub. No.: WO2011/071033
PCT Pub. Date: Jun. 16, 2011

(65) Prior Publication Data
US 2012/0204677 A1 Aug. 16, 2012

(30) Foreign Application Priority Data
Dec. 7, 2009 (JP) .................................. 2009-278052

(51) Int. Cl.
*C22C 19/03* (2006.01)

(52) U.S. Cl.
USPC .................................. 75/231; 75/244; 75/246

(58) Field of Classification Search
CPC .............................. C22C 1/0433; C22C 19/03
USPC ......................................... 75/231, 246; 419/2
See application file for complete search history.

(56) References Cited

U.S. PATENT DOCUMENTS

| | | | | |
|---|---|---|---|---|
| 5,714,700 A | * | 2/1998 | Nishida et al. | 75/231 |
| 6,135,415 A | | 10/2000 | Kloda et al. | |
| 8,361,939 B2 | * | 1/2013 | Yuasa et al. | 508/105 |
| 2009/0011268 A1 | * | 1/2009 | Shimizu et al. | 428/550 |

FOREIGN PATENT DOCUMENTS

| | | |
|---|---|---|
| JP | 63-109131 A | 5/1988 |
| JP | 11-158511 A | 6/1999 |
| JP | 2000-309807 A | 11/2000 |
| JP | 2002-521610 A | 7/2002 |
| JP | 2004-068074 A | 3/2004 |
| JP | 2006-097797 A | 4/2006 |

OTHER PUBLICATIONS

International Search Report mailed Feb. 8, 2011 for the corresponding International Application No. PCT/JP2010/071879.

* cited by examiner

*Primary Examiner* — George Wyszomierski
*Assistant Examiner* — Ngoclan T Mai
(74) *Attorney, Agent, or Firm* — Leason Ellis LLP.

(57) ABSTRACT

There is provided a novel sintered sliding member superior in thermal resistance, corrosion resistance and wear resistance. The sintered sliding member of the present invention includes 7.7-30.3% Cu, 2.0-20.0% Sn and 0.3-7.0% boron nitride by mass, with a remainder composed of Ni and unavoidable impurities. The sintered sliding member may further include 0.1-3.0% C or 0.1-0.7% P. A porosity of the sintered sliding member is 5-25%.

6 Claims, 1 Drawing Sheet

SINTERED SLIDING MEMBER

CROSS REFERENCE TO THE RELATED APPLICATIONS

This application is a U.S. National Phase Application under 35 U.S.C. §371 of International Patent Application No. PCT/JP2010/071879, filed Dec. 7, 2010, and claims the benefit of Japanese Patent Application No. 2009-278052, filed Dec. 7, 2009, all of which are incorporated by reference herein. The International Application was published in Japanese on Jun. 16, 2011 as International Publication No. WO/2011/071033 under PCT Article 21(2).

FIELD OF THE INVENTION

The present invention relates to a sintered sliding member superior in thermal resistance, corrosion resistance and wear resistance,

BACKGROUND OF THE INVENTION

As a sintered sliding member exposed to a high-temperature exhaust gas, there has been known a bearing used in a recirculated exhaust gas flow rate regulating valve of an EGR (Exhaust Gas Recirculation) type internal-combustion engine (Japanese Unexamined Patent Application Publication (Translation of PCT Application) No. 2002-521610). Particularly, as a bearing used in the recirculated exhaust gas flow rate regulating valve of the EGR type internal-combustion engine, there have been known: a bearing made of graphite; and a bearing made of a sintered Cu alloy containing 7-10% Sn and 5-9% C by mass.

However, the internal-combustion engine has been made dramatically high-powered and fuel-efficient in recent years. Further, it has been strongly required that the internal-combustion engine be made lighter and more compact. For this reason, the aforementioned recirculated exhaust gas flow rate regulating valve is now more often than not provided in the vicinity of a combustion chamber of the engine. As a result, it is assumed that the recirculated exhaust gas flow rate regulating valve is now disposed in a high-temperature environment of 500-600° C. in association with an increasing heat generated by the high-powered engine.

As a bearing that can be used in such a high-temperature environment, Japanese Unexamined Patent Application Publication No. 2004-68074 discloses a bearing made of a sintered Cu alloy containing: 10-30% Ni, 5-12% Sn and 3-10% C by mass; and a remainder composed of Cu and unavoidable impurities. Such sintered Cu alloy has a structure in which free graphite is dispersed in a Cu—Ni—Sn-based solid solution serving as a basis material.

Meanwhile, examples of sintered sliding members exposed to seawater or a snow melting agent, include: a sliding member for use in an outboard motor; and a bearing of an exhaust throttle valve used in a diesel exhaust emission purification system. It is required that these members exhibit high corrosion resistance. Particularly, the bearing of the exhaust throttle valve is required to exhibit thermal resistance, corrosion resistance and wear resistance, when heated by a high-temperature chloride and cooled, in a repeated manner. In fact, this bearing is a stainless-steel member.

Problem to be Solved by the Invention

While the sintered Cu alloy disclosed in Japanese Unexamined Patent Application Publication No. 2004-68074 does exhibit a superior wear resistance even in a high-temperature environment, there is desired a sintered sliding member superior also in thermal resistance and corrosion resistance.

Further, although the stainless-steel bearing can exhibit a superior thermal resistance and a superior corrosion resistance when heated by the high temperature chloride and cooled in a repeated manner, the wear resistance exhibited thereby under the same condition is not sufficient.

Here, it is an object of the present invention to provide a novel sintered sliding member superior in thermal resistance, corrosion resistance and wear resistance.

SUMMARY OF THE INVENTION

Means for Solving the Problem

A sintered sliding member of the present invention includes 7.7-30.3% Cu, 2.0-20.0% Sn and 0.3-7.0% boron nitride by mass, such sintered sliding member further including a remainder composed of Ni and unavoidable impurities.

A sintered sliding member of the present invention includes 7.7-30.3% Cu, 2.0-20.0% Sn, 0.3-7.0% boron nitride and 0.1-3.0% C by mass, such sintered sliding member further including a remainder composed of Ni and unavoidable impurities.

A sintered sliding member of the present invention includes 7.7-30.3% Cu, 2.0-20.0% Sn, 0.3-7.0% boron nitride and 0.1-0.7% P by mass, such sintered sliding member further including a remainder composed of Ni and unavoidable impurities.

Each one of the aforementioned sintered sliding members of the present invention, exhibits a porosity of 5-25%.

Effects of the Present Invention

The sintered sliding member of the present invention includes: 7.7-30.3% Cu, 2.0-20.0% Sn and 0,3-7.0% boron nitride by mass; and the remainder composed of Ni and the unavoidable impurities, thus being superior in thermal resistance, corrosion resistance and wear resistance.

The sintered sliding member of the present invention includes: 7.7-30.3% Cu, 2.0-20.0% Sn, 0.3-7.0% boron nitride and 0.1-3.0% C by mass; and the remainder composed of Ni and the unavoidable impurities, thus being superior in thermal resistance, corrosion resistance and wear resistance.

The sintered sliding member of the present invention includes: 7.7-30.3% Cu, 2.0-20.0% Sn, 0.3-7.0% boron nitride and 0.1-0.7% P by mass; and the remainder composed of Ni and the unavoidable impurities, thus being superior in thermal resistance, corrosion resistance and wear resistance.

Each one of the aforementioned sintered sliding members of the present invention, exhibits the porosity of 5-25%, thereby reducing a friction resistance, thus being more superior in wear resistance.

DETAILED DESCRIPTION OF THE INVENTION

Figure 1:
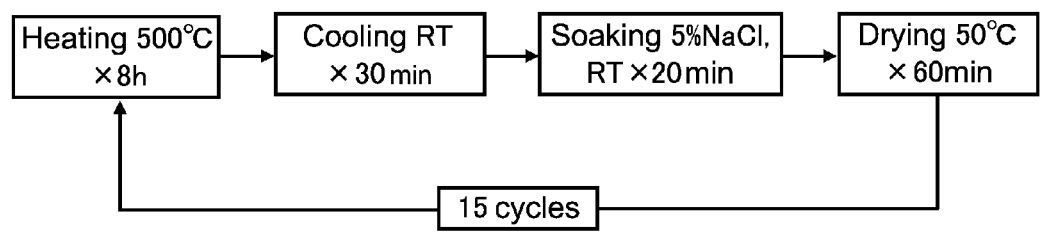
FIG. 1 is a block diagram showing a condition for a high-temperature salt damage cycle test.

Best Mode for Carrying out the Invention

A sintered sliding member of the present invention includes 7.7-30.3% Cu, 2.0-20.0% Sn, and 0.3-7.0% boron nitride by mass. Further, the sintered sliding member includes a remainder composed of Ni and unavoidable impurities. In fact, the sintered sliding member of the present invention contains less Cu than a conventional sintered Cu-based alloy, thus relatively increasing an amount of Ni contained therein. Further, the sintered sliding member contains boron nitride as described above. For these reasons, the sintered sliding member of the present invention exhibits a superior thermal resistance and corrosion resistance.

Further, a sintered sliding member of the present invention includes 7.7-30.3% Cu, 2.0-20.0% Sn, 0.3-7.0% boron nitride, and 0.1-3.0% C by mass. Further, this sintered sliding member includes a remainder composed of Ni and unavoidable impurities. In fact, this sintered sliding member of the present invention contains less Cu than the conventional sintered Cu-based alloy, thus relatively increasing an amount of Ni contained therein. Further, this sintered sliding member contains boron nitride as described above. For these reasons, this sintered sliding member of the present invention exhibits a superior thermal resistance, wear resistance and corrosion resistance. Moreover, since this sintered sliding member contains C as described above, a more superior thermal resistance and corrosion resistance can be achieved therewith.

Furthermore, a sintered sliding member of the present invention includes 7.7-30.3% Cu, 2.0-20.0% Sn, 0.3-7.0% boron nitride, and 0.1-0.7% P by mass. Further, this sintered sliding member includes a remainder composed of Ni and unavoidable impurities. In fact, this sintered sliding member of the present invention contains less Cu than the conventional sintered Cu-based alloy, thus relatively increasing an amount of Ni contained therein. Further, this sintered sliding member contains boron nitride as described above. For these reasons, this sintered sliding member of the present invention exhibits a superior thermal resistance, corrosion resistance and wear resistance. Moreover, since this sintered sliding member contains P, a strength of a basis material is improved, thereby achieving a more superior wear resistance.

Here, each one of the aforementioned sintered sliding members exhibits a porosity of 5-25%. Such configuration leads to a reduced friction resistance and a more superior wear resistance.

Next, there are described in detail a composition and the porosity of the sintered sliding member of the present invention. All the contents described hereunder are expressed as percentages by mass.

(a) Cu

Cu has an effect of improving the wear resistance of the sintered sliding member by forming a solid solution serving as a basis material, with Ni and Sn. An insufficient wear resistance is resulted when a Cu content is less than 7.7%. Meanwhile, when the Cu content is greater than 30.3%, an insufficient thermal resistance and an insufficient corrosion resistance are unfavorably resulted. Accordingly, the Cu content was set to be 7.7-30.3%.

(b) Sn

Sn improves a sinterability by lowering a melting point, and contributes to improving the strength and the wear resistance of the sintered sliding member by forming the solid solution with Cn and Ni. A given wear resistance cannot be achieved when an Sn content is less than 2%. Meanwhile, when the Sn content is greater than 20%, an aggression toward an opposite sliding member is enhanced, thus unfavorably abrading the opposite sliding member. Accordingly, the Sn content was set to be 2.0-20.0%.

(c) Boron Nitride (BN)

Boron nitride serves as a solid lubricant providing the sintered sliding member with a superior lubricity, and reduces a metallic contact between the sliding members, thereby contributing to improving the wear resistance of the sintered sliding member. Further, boron nitride has an effect of improving a high-temperature salt damage resistance. The desired effect cannot be achieved when a boron nitride content is less than 0.3%. Meanwhile, when the boron nitride content is greater than 7.0%, the strength of the sintered sliding member is unfavorably decreased. Accordingly, the boron nitride content was set to be 0.3-7.0%.

(d) C

C is dissolved in the basis material to form the solid solution, and serves as a solid lubricant providing the sintered sliding member with a superior high-temperature salt damage resistance. An addition effect of C cannot be observed when a C content is less than 0.1%. Meanwhile, when the C content is greater than 3.0%, the strength and the wear resistance of the sintered sliding member are unfavorably decreased. Accordingly, the C content was set to be 0.1-3.0%, if C was added.

(e) P

P contributes to improving wear resistance. An addition effect of P cannot be observed when a P content is less than 0.1%. Meanwhile, when the P content is greater than 0.7%, the corrosion resistance of the sintered sliding member is unfavorably decreased. Accordingly, the P content was set to be 0.1-0.7%, if P was added.

(f) Porosity

When the porosity is less than 5%, a deformation resistance of the sintered sliding member is increased, thus making it impossible to obtain a sufficient dimensional accuracy in a correction operation. Meanwhile, when the porosity is greater than 25%, mechanical properties of the sintered sliding member are decreased, thus making it impossible to obtain a satisfactory property such as a satisfactory strength or the like through sizing and coining. Accordingly, in the aforementioned composition, the porosity was set to be 5-25%.

Next, there is described a specific embodiment of the sintered sliding member of the present invention. However, the present invention is not limited to the following embodiment, In fact, various modified embodiments are possible. For example, the embodiment described hereunder is a bearing having a sliding surface on an inner circumference thereof. However, the sintered sliding member of the present invention is not limited to such embodiment. In fact, various embodiments are possible with the sintered sliding member of the present invention.

Embodiment

As raw powders, there were prepared: an atomized Ni-30% Cu powder with a particle diameter of 100 meshes; a Ni powder with an average particle diameter of 4.0 μm; a Cu powder with a particle diameter of 200 meshes; an atomized Sn powder with a particle diameter of 250 meshes; a boron nitride powder with a particle diameter of 75 μm; and a graphite powder with a particle diameter of 150 meshes. These raw powders were then combined together to obtain final element compositions shown in Table 1. Here, zinc stearate was further added to each composition by 0.5% before mixing the corresponding composition through a V-shape mixer for 30 minutes. A pressurized powder body was then manufactured through press molding, after mixing the aforementioned composition. The pressurized powder body thus manufactured was then sintered in an atmosphere of an endothermic gas, by being held therein for 20 minutes and at a sintering temperature of 1050° C. Here, the endothermic gas atmosphere is prepared by cracking and converting a mixed gas of a natural gas and air through a heated catalyst. Sizing was then performed on the pressurized powder body thus sintered.

In this way, there were manufactured ring-shaped specimens having various element compositions (examples 1-15 and comparative examples 1-8 of the present invention). Each one of the ring-shaped specimens serves as a bearing and had a dimension of 18 mm×8 mm×8 mm (outer diameter×inner diameter×height). The following tests were then performed on the ring-shaped specimens.

Wear Resistance Test

A SUS304 stainless-steel shaft treated with hard chromium plating was inserted through each one of the ring-shaped specimens of the examples 1-15 and comparative examples 1-8 of the present invention. A sliding test was then performed in the following manner. That is, the stainless-steel shaft was caused to reciprocate within a range of an arc intercepted by a central angle of 90° of the ring-shaped specimen. Specifically, the sliding test was performed with a load of 29 N being applied from outside the ring-shaped specimen toward a radial direction thereof (a direction orthogonal to an axial direction of the stainless-steel shaft), and with the ring-shaped specimen being heated and controlled at a temperature of 120° C. More specifically, the sliding test was performed under a dry condition in which no lubricant oil was used. After performing the reciprocating sliding test for 500,000 cycles, there were measured a maximum worn depth in the inner diameter of the bearing, and a maximum worn depth of the stainless-steel shaft, so as to evaluate wear resistance. The results thereof are listed in Table 1, under "Maximum worn depth" and "Maximum worn depth of stainless-steel shaft," respectively.

High-temperature Salt Damage Cycle Test

A high-temperature salt damage cycle test was repeatedly performed for 15 cycles on each one of the ring-shaped specimens of the examples 1-15 and comparative examples 1-8. Here, an amount of a dimensional change in the inner diameter of the ring-shaped specimen before and after the test was obtained, so as to evaluate a corrosion level of the specimen exposed to a high-temperature salt damage environment. The results thereof are listed in Table 1, under "High-temperature salt damage resistance (dimensional change in inner diameter)". In fact, the more favorable the high-temperature salt damage resistance of the specimen was, the smaller the amount of the dimensional change in the inner diameter became.

As shown in FIG. 1, each one of the 15 cycles of the high-temperature salt damage cycle test successively included: heating the specimen at a temperature of 500° C. for eight hours; cooling the corresponding specimen at a room temperature for 30 minutes; soaking the specimen thus cooled in a salt solution of 5% for 20 minutes at a room temperature; drying the specimen at a temperature of 50° C. for 60 minutes; and again heating the specimen at the temperature of 500° C. for eight hours.

Porosity Measurement

Porosities of the ring-shaped specimens of the examples 1-15 and comparative examples 1-8 were measured. Measurement values thereof are listed in Table 1, under "Porosity." Here, the porosities were measured according to JISZ2501 (Sintered metal material-Determination of density, oil content and open porosity).

TABLE 1

| Ni—Cu—Sn-based sintered sliding member | | Element composition (mass %) | | | | | | Porosity (%) | Maximum worn depth A (mm) | Maximum worn depth of stainless shaft B (mm) | Combined worn depth A + B (mm) | High-temperature salt damage resistance (dimensional change in inner diameter/mm) |
|---|---|---|---|---|---|---|---|---|---|---|---|---|
| | | Cu | Sn | P | BN | C | Ni + Impurities | | | | | |
| Examples of the present invention | 1 | 30 | 9 | — | 2 | — | Remainder | 16.1 | 0.005 | 0.007 | 0.012 | 0.072 |
| | 2 | 27 | 9 | — | 2 | — | Remainder | 20.3 | 0.006 | 0.003 | 0.009 | 0.011 |
| | 3 | 5 | 5 | — | 2 | — | Remainder | 22.5 | 0.016 | 0.015 | 0.031 | 0.006 |
| | 4 | 26 | 2.5 | — | 2 | — | Remainder | 24.7 | 0.032 | 0.001 | 0.033 | 0.033 |
| | 5 | 26 | 9 | — | 2 | — | Remainder | 18.8 | 0.005 | 0.002 | 0.007 | 0.009 |
| | 6 | 26 | 14 | — | 2 | — | Remainder | 14.4 | 0.004 | 0.008 | 0.012 | 0.020 |
| | 7 | 30 | 19 | — | 4 | — | Remainder | 5.8 | 0.002 | 0.031 | 0.033 | 0.046 |
| | 8 | 26 | 9 | — | 0.5 | — | Remainder | 12.5 | 0.020 | 0.012 | 0.032 | 0.028 |
| | 9 | 26 | 9 | — | 4 | — | Remainder | 20.1 | 0.003 | 0.002 | 0.005 | 0.010 |
| | 10 | 30 | 20 | — | 6.5 | — | Remainder | 24.5 | 0.018 | 0.001 | 0.019 | 0.025 |
| | 11 | 25 | 9 | 0.3 | 2 | — | Remainder | 19.3 | 0.003 | 0.009 | 0.012 | 0.045 |
| | 12 | 25 | 9 | 0.4 | 2 | — | Remainder | 20.6 | 0.001 | 0.014 | 0.015 | 0.057 |
| | 13 | 21 | 9 | — | 2 | 0.1 | Remainder | 9.9 | 0.030 | 0.023 | 0.053 | 0.077 |
| | 14 | 19 | 9 | — | 2.0 | 0.4 | Remainder | 10.5 | 0.037 | 0.006 | 0.043 | 0.049 |
| | 15 | 16 | 9 | — | 2 | 1 | Remainder | 14.6 | 0.043 | 0.003 | 0.046 | 0.031 |
| Comparative examples | 1 | 44* | 14 | — | 3.5 | — | Remainder | 22.9 | 0.003 | 0.001 | 0.004 | 0.299 |
| | 2 | 5* | 3 | — | 1 | — | Remainder | 23.4 | 0.154 | 0.048 | 0.202 | 0.005 |
| | 3 | 28 | 1.5* | — | 1 | — | Remainder | 16.7 | 0.128 | 0.003 | 0.131 | 0.023 |
| | 4 | 10 | 22* | — | 1.2 | — | Remainder | 6.8 | 0.004 | 0.213 | 0.217 | 0.107 |
| | 5 | 26 | 9 | — | 0* | — | Remainder | 6.8 | 0.019 | 0.059 | 0.078 | 0.174 |
| | 6 | 26 | 9 | — | 9* | — | Remainder | 27.6* | 0.118 | 0.004 | 0.122 | 0.038 |
| | 7 | 26 | 9 | 1.0* | 2 | — | Remainder | 8.2 | 0.001 | 0.144 | 0.145 | 0.332 |
| | 8 | 26 | 9 | — | 7.0 | 4* | Remainder | 24.3 | 0.246 | 0.005 | 0.251 | 0.039 |

(Numbers marked with * in Table 1 are beyond the scope of the present invention)

As shown in Table 1, each one of the specimens of the examples 1-15 of the present invention exhibited a maximum worn depth of not larger than 0.100 mm and a high-temperature salt damage resistance (dimensional change in inner diameter) of not larger than 0.100 mm. That is, each one of the specimens of the examples 1-15 of the present invention exhibited wear resistance, thermal resistance and corrosion resistance.

Meanwhile, the specimens of the comparative examples 1-8 exhibited large maximum worn depths or high-temperature salt damage resistances (dimensional change in inner diameter) that were not smaller than 0.1 mm.

The aforementioned results confirmed that the sintered sliding member of the present invention was superior in wear resistance, thermal resistance and corrosion resistance.

Figure 2:
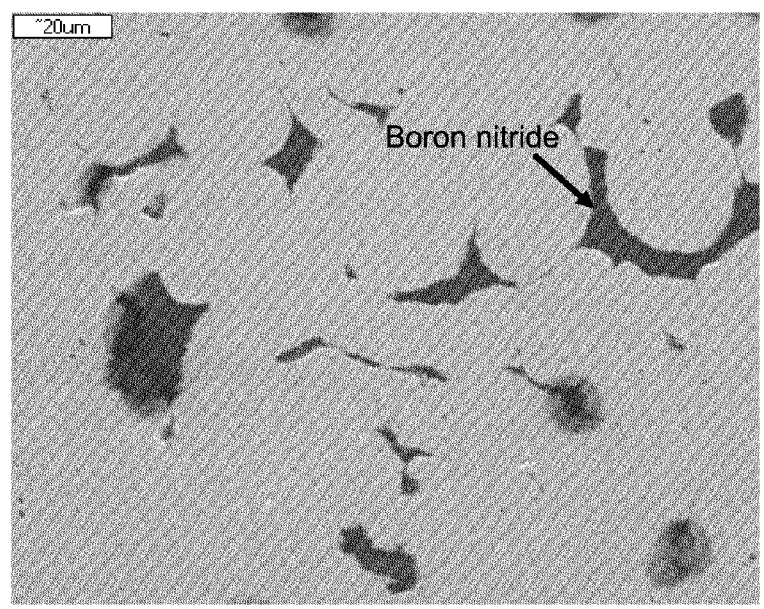
FIG. 2 is an electron micrograph of an embodiment of a sintered sliding member of the present invention.

FIG. 2 is a scanning electron micrograph showing a sectional structure of the sintered sliding member of the preset invention 1. Particularly, it was confirmed that the boron nitride powder was dispersed in the base of Ni—Cu—Sn.

The invention claimed is:

1. A sintered sliding member comprising, by mass %:
7.7-30.3% Cu;
2.0-20.0% Sn;
0.3-7.0% boron nitride; and
a remainder including Ni and unavoidable impurities.

2. A sintered sliding member comprising, by mass %:
7.7-30.3% Cu;
2.0-20.0% Sn;
0.3-7.0% boron nitride;
0.1-3.0% C; and
a remainder including Ni and unavoidable impurities.

3. A sintered sliding member comprising, by mass %:
7.7-30.3% Cu;
2.0-20.0% Sn;
0.3-7.0% boron nitride;
0.1-0.7% P; and
a remainder including Ni and unavoidable impurities.

4. The sintered sliding member according to claim 1, wherein said sintered sliding member has a porosity of 5-25%.

5. The sintered sliding member according to claim 2, wherein said sintered sliding member has a porosity of 5-25%.

6. The sintered sliding member according to claim 3, wherein said sintered sliding member has a porosity of 5-25%.

* * * * *